(12) United States Patent
Mao et al.

(10) Patent No.: US 11,363,263 B2
(45) Date of Patent: Jun. 14, 2022

(54) DATA CODING METHOD AND APPARATUS, TERMINAL DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xunan Mao, Shenzhen (CN); Yaoyao Guo, Shenzhen (CN); Chenchen Gu, Shenzhen (CN); Xinwei Gao, Shenzhen (CN); Licai Guo, Shenzhen (CN); Yongfang Shi, Shenzhen (CN); Anlin Gao, Shenzhen (CN); Haibo Deng, Shenzhen (CN); Jing Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 555 days.

(21) Appl. No.: 16/400,334

(22) Filed: May 1, 2019

(65) Prior Publication Data
US 2019/0260991 A1 Aug. 22, 2019

Related U.S. Application Data

(63) Continuation of application No. PCT/CN2018/086681, filed on May 14, 2018.

(30) Foreign Application Priority Data

Jul. 6, 2017 (CN) .......................... 201710544962.7

(51) Int. Cl.
*H04N 19/115* (2014.01)
*H04N 19/15* (2014.01)
(Continued)

(52) U.S. Cl.
CPC ......... *H04N 19/115* (2014.11); *H04N 19/114* (2014.11); *H04N 19/146* (2014.11);
(Continued)

(58) Field of Classification Search
CPC .. H04N 19/115; H04N 19/114; H04N 19/146; H04N 19/15; H04N 19/172; H04N 19/177
(Continued)

(56) References Cited

U.S. PATENT DOCUMENTS 6,501,800 B1   12/2002  Sawada
6,661,840 B1 * 12/2003  Hiranaka ............. H04N 19/176
                                                  375/240.03
(Continued)

FOREIGN PATENT DOCUMENTS

CN   105872594 A   8/2016
CN   106060548 A   10/2016
(Continued)

OTHER PUBLICATIONS

The European Patent Office (EPO) The Extended European Search Report for 18827343.7 dated Feb. 23, 2021 12 Pages (including translation).
(Continued)

*Primary Examiner* — Clifford Hilaire
*Assistant Examiner* — Kristin Dobbs
(74) *Attorney, Agent, or Firm* — Anova Law Group, PLLC (57) ABSTRACT

A data coding method includes determining a length of a current first bit-rate-control-unit data frame in to-be-transmitted data, and the length of the first bit-rate-control-unit data frame is less than or equal to a length of a group of pictures (GOP) data frame. The method also includes determining a first target bit rate of the first bit-rate-control-unit
(Continued)

data frame according to the length of the first bit-rate-control-unit data frame, a target bit rate of the to-be-transmitted data, and a frame rate of the to-be-transmitted data and, when a first difference value between a real bit rate of a second bit-rate-control-unit data frame and a second target bit rate of the second bit-rate-control-unit data frame is greater than zero, adjusting the first target bit rate according to the first difference value, and coding the first bit-rate-control-unit data frame according to the adjusted first target bit rate.

20 Claims, 5 Drawing Sheets

(51) Int. Cl.
  *H04N 19/177*  (2014.01)
  *H04N 19/146*  (2014.01)
  *H04N 19/114*  (2014.01)
  *H04N 19/172*  (2014.01)

(52) U.S. Cl.
  CPC ........... *H04N 19/15* (2014.11); *H04N 19/172* (2014.11); *H04N 19/177* (2014.11)

(58) Field of Classification Search
  USPC .................................................. 375/240.02
  See application file for complete search history.

(56) References Cited

U.S. PATENT DOCUMENTS

| | | |
|---|---|---|
| 2006/0224762 A1 | 10/2006 | Tian et al. |
| 2011/0255594 A1 | 10/2011 | Nagori et al. |

FOREIGN PATENT DOCUMENTS

| | | | |
|---|---|---|---|
| CN | 106331704 A | 1/2017 | |
| CN | 106488175 A | 3/2017 | |
| EP | 1372113 A1 * | 12/2003 | ........... H04N 19/149 |
| EP | 1372113 A1 | 12/2003 | |
| EP | 2290654 A1 | 3/2011 | |
| EP | 3016395 A1 | 5/2016 | |
| JP | 2001086512 A | 3/2001 | |
| JP | 2013524740 A | 6/2013 | |
| WO | 9731481 A1 | 8/1997 | |
| WO | 0065842 A1 | 11/2000 | |

OTHER PUBLICATIONS

The European Patent Office (EPO) The Partial Supplementary European Search Report for 18827343.7 dated Dec. 23, 2020 12 Pages (including translation).

The Japan Patent Office (JPO) Notification of Reasons for Refusal for Application No. 2019-554773 and Translation dated Nov. 10, 2020 8 Pages.

The World Intellectual Property Organization (WIPO) International Search Report for PCT/CN2018/086681 dated Aug. 8, 2018 5 Pages (including translation).

* cited by examiner

DATA CODING METHOD AND APPARATUS, TERMINAL DEVICE, AND COMPUTER-READABLE STORAGE MEDIUM

RELATED APPLICATIONS

This application is a continuation application of PCT Patent Application No. PCT/CN2018/086681, filed on May 14, 2018, which claims priority to Chinese Patent Application No. 201710544962.7, entitled "DATA CODING METHOD AND APPARATUS, STORAGE DEVICE, AND TERMINAL DEVICE" filed with the Patent Office of China on Jul. 6, 2017, both of which are incorporated by reference in their entirety.

FIELD OF TECHNOLOGY

This application relates to the field of information processing technologies and, in particular, to a data coding method and apparatus, a terminal device, and a computer-readable storage medium.

BACKGROUND OF THE DISCLOSURE

In a video transmission process, a video transmitting-end needs to code video data, and then sends out the coded video data. When coding the video data, the video transmitting-end needs to allocate a coding rate, and then to code the video data according to the coding rate.

In existing technology, the video transmitting-end uses a group of pictures (GOP) video frame as a bit-rate-control-unit, first allocates a bit rate to each GOP video frame, then allocates a bit rate to video data of a current frame before coding video data of each frame, and finally enables a real bit rate of a GOP video frame to approach to a bit rate allocated to the GOP video frame. However, when a GOP video frame has a relatively large size, although an overall bit rate of the GOP video frame may reach a target bit rate, stability of a short-time bit rate is not considered.

The disclosed methods and systems are directed to solve one or more problems set forth above and other problems.

SUMMARY

Embodiments of this application provide a data coding method and apparatus, a storage device, and a terminal device, to adjust a first target bit rate of a first bit-rate-control-unit data frame according to a first difference value between a real bit rate of a second bit-rate-control-unit data frame and a second target bit rate of the second bit-rate-control-unit data frame.

According to one aspect of the present disclosure, a data coding method is provided. The data coding method includes determining a length of a current first bit-rate-control-unit data frame in to-be-transmitted data, and the length of the first bit-rate-control-unit data frame is less than or equal to a length of a group of pictures (GOP) data frame. The method also includes determining a first target bit rate of the first bit-rate-control-unit data frame according to the length of the first bit-rate-control-unit data frame, a target bit rate of the to-be-transmitted data, and a frame rate of the to-be-transmitted data and, when a first difference value between a real bit rate of a second bit-rate-control-unit data frame and a second target bit rate of the second bit-rate-control-unit data frame is greater than zero, adjusting the first target bit rate according to the first difference value, and coding the first bit-rate-control-unit data frame according to the adjusted first target bit rate. The second bit-rate-control-unit data frame is a previous bit-rate-control-unit data frame of the first bit-rate-control-unit data frame in the to-be-transmitted data.

According to another aspect of the present disclosure, a data coding apparatus is provided. The data coding apparatus includes a length determining unit, configured to determine a length of a current first bit-rate-control-unit data frame in to-be-transmitted data, the length of the first bit-rate-control-unit data frame being less than or equal to a length of a group of pictures (GOP) data frame; a bit rate determining unit, configured to determine a first target bit rate of the first bit-rate-control-unit data frame according to the length of the first bit-rate-control-unit data frame, a target bit rate of the to-be-transmitted data, and a frame rate of the to-be-transmitted data; an adjusting unit, configured to: when a first difference value between a real bit rate of a second bit-rate-control-unit data frame and a second target bit rate of the second bit-rate-control-unit data frame is greater than zero, adjust the first target bit rate according to the first difference value, the second bit-rate-control-unit data frame being a previous bit-rate-control-unit data frame of a first bit-rate-control-unit in the to-be-transmitted data; and a coding unit, configured to code the first bit-rate-control-unit data frame according to the adjusted first target bit rate.

According to another aspect of the present disclosure, a non-transitory computer-readable storage medium is provided. The computer-readable storage medium stores computer program instructions executable by at least one processor to perform: determining a length of a current first bit-rate-control-unit data frame in to-be-transmitted data, the length of the first bit-rate-control-unit data frame being less than or equal to a length of a group of pictures (GOP) data frame; determining a first target bit rate of the first bit-rate-control-unit data frame according to the length of the first bit-rate-control-unit data frame, a target bit rate of the to-be-transmitted data, and a frame rate of the to-be-transmitted data; when a first difference value between a real bit rate of a second bit-rate-control-unit data frame and a second target bit rate of the second bit-rate-control-unit data frame is greater than zero, adjusting the first target bit rate according to the first difference value, the second bit-rate-control-unit data frame being a previous bit-rate-control-unit data frame of the first bit-rate-control-unit data frame in the to-be-transmitted data; and coding the first bit-rate-control-unit data frame according to the adjusted first target bit rate.

Other aspects of the present disclosure can be understood by those skilled in the art in light of the description, the claims, and the drawings of the present disclosure.

BRIEF DESCRIPTION OF THE DRAWINGS

To more clearly describe the technical solutions in the embodiments of the present disclosure, the following briefly describes the accompanying drawings. Apparently, the accompanying drawings in the following description show merely some embodiments of the present disclosure, and a person of ordinary skill in the art may derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some, but not all, embodiments of the present disclosure. All other embodiments obtained by a person of ordinary skill in the art based on the described embodiments of the present disclosure without creative efforts shall fall within the protection scope of the present disclosure.

In the specification, claims, and accompanying drawings of the present disclosure, the terms "first", "second", "third", "fourth", and so on (if exists) are intended to distinguish similar objects but do not necessarily indicate a specific order or sequence. It should be understood that the data termed in such a way are interchangeable in proper circumstances, so that the embodiments of the present disclosure described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those steps or modules, but may include other steps or units not expressly listed or inherent to such a process, method, product, or device.

A data coding method provided in an embodiment of the present disclosure is mainly used in a process in which a data transmitting-end sends to-be-transmitted data to a data receiving-end. In this process, the data transmitting-end needs to first code each group of GOP data frames (i.e., the data frames in a GOP, or group of pictures) in the to-be-transmitted data, and then sends coded data to a data receiving-end. The transmitting-end or receiving-end may refer to any terminal device, any portion of the terminal device, or any program running on the terminal device, etc., that are capable of transmitting or receiving data.

In one embodiment, when coding a bit-rate-control-unit data frame in the to-be-transmitted data, the data transmitting-end first determines a length of a current first bit-rate-control-unit data frame in the to-be-transmitted data, the length of the first bit-rate-control-unit data frame being less than or equal to a length of a GOP data frame, and determines a first target bit rate of the first bit-rate-control-unit data frame according to the length of the first bit-rate-control-unit data frame, a target bit rate of the to-be-transmitted data, and a frame rate of the to-be-transmitted data. Further, when a first difference value between a real bit rate of a second bit-rate-control-unit data frame and a second target bit rate of the second bit-rate-control-unit data frame is greater than zero, the data transmitting-end adjusts the first target bit rate according to the first difference value, the second bit-rate-control-unit data frame being a previous bit-rate-control-unit data frame of a first bit-rate-control-unit in the to-be-transmitted data; and codes the first bit-rate-control-unit data frame according to the adjusted first target bit rate.

In this way, the data transmitting-end can flexibly set the length of the first bit-rate-control-unit data frame, for example, to be less than or equal to the length of the GOP data frame, and adjusts the first target bit rate according to an actual coding case of the previous bit-rate-control-unit data frame, so that after the first bit-rate-control-unit is coded according to the adjusted first target bit rate, a requirement for a stable bit rate in any duration, particularly, in a short time, can be satisfied.

Figure 1:
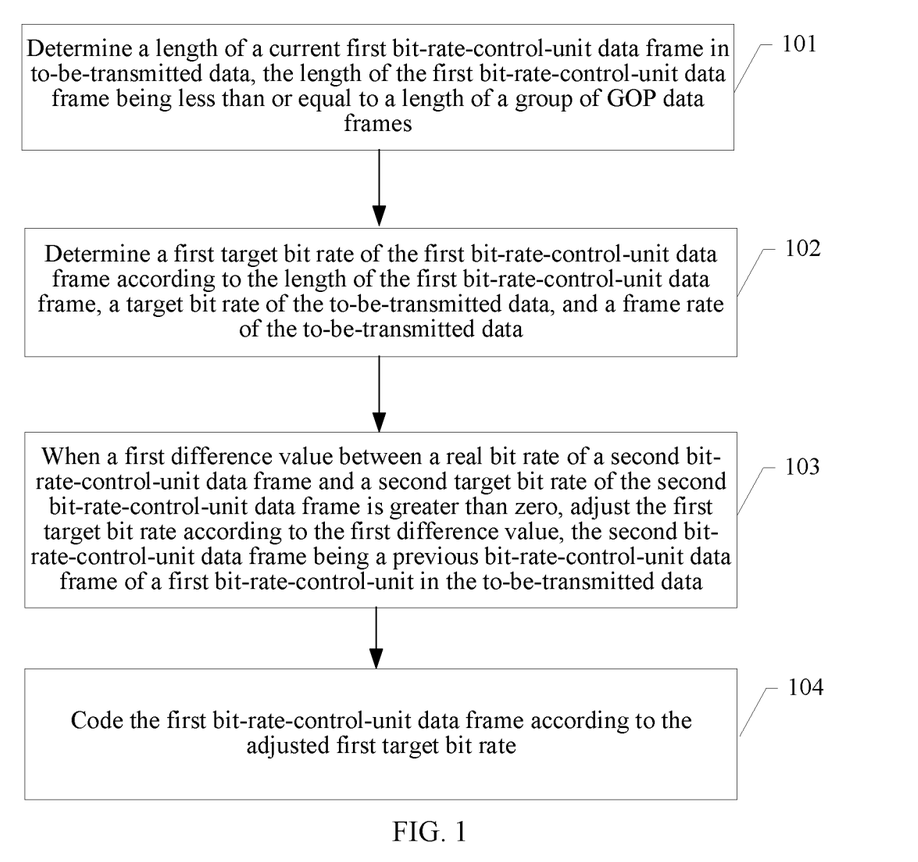
FIG. 1 is a flowchart of a data coding method according to an embodiment of the present disclosure.

An embodiment of the present disclosure provides a data coding method, which is mainly the method performed by the foregoing data transmitting-end. The data transmitting-end may be a video data transmitting-end, for example, a WeChat client. A flowchart is shown in FIG. 1. As shown in FIG. 1, the method includes the following steps:

Step 101. Determining a length of a current first bit-rate-control-unit data frame in the to-be-transmitted data, the length of the first bit-rate-control-unit data frame being less than or equal to a length of a GOP.

It can be understood that, before sending the to-be-transmitted data to a data receiving-end, the data transmitting-end needs to code the to-be-transmitted data. Generally, a bit-rate-control-unit data frame is used as a basic unit for coding a plurality of bit-rate-control-units included in the to-be-transmitted data one by one. Specifically, a target bit rate is first determined for a bit-rate-control-unit data frame, so that a real bit rate of bit-rate-control-unit data frame is enabled to approach to the target bit rate of the bit-rate-control-unit data frame. The bit rate of the bit-rate-control-unit data frame is a total amount of data included in the bit-rate-control-unit data frame.

Steps 101 to 104 in this embodiment are a coding method performed for a data frame of a bit-rate-control-unit (namely, a current first bit-rate-control-unit).

Generally, the to-be-transmitted data includes a plurality of groups of GOP data frames, and each group of GOP data frames includes an I-frame, a P-frame, and a B-frame. The first data frame is the I-frame, and is a key frame, and main information of this group of GOP data frames is centralized on the I-frame. The P-frame is a difference frame, and indicates a difference between this frame and a previous key frame. The B-frame is a bidirectional difference frame, and indicates a difference between this frame and previous and following frames. A length of the group of the GOP data frames may be represented by an interval of the I-frame, and may be specifically n data frames.

In one embodiment, the length that is of the first bit-rate-control-unit data frame and that is determined by the data transmitting-end may be less than the length of the group of the GOP data frames, and may be specifically a number of data frames included in short time duration (for example, 1 second or 2 seconds) in which a stable bit rate is required. In this case, the group of GOP data frames may be divided into a plurality of bit-rate-control-unit data frames. Each bit-rate-control-unit may include one or more data frames in the GOP to be controlled as one unit with respect to the bit rate, and the data frame(s) in the bit-rate-control-unit may also be referred as the bit-rate-control-unit data frame.

For example, for a real-time video call, a requirement for a stable bit rate in a short time is relatively high. When the to-be-transmitted data is video data of the real-time call, the length of the first bit-rate-control-unit data frame may be determined as the number of data frames included in a duration in which a stable bit rate is required.

Step 102. Determining a first target bit rate of the first bit-rate-control-unit data frame according to the length of the first bit-rate-control-unit data frame, a target bit rate of the to-be-transmitted data, and a frame rate (to be specific, a number of data frames included per second) of the to-be-transmitted data.

Specifically, the first target bit rate may be determined as a quotient obtained by dividing a product of the target bit rate of the to-be-transmitted data and the length of the first bit-rate-control-unit data frame by the frame rate of the to-be-transmitted data.

Step 103. When a first difference value between a real bit rate of a second bit-rate-control-unit data frame and a second target bit rate of the second bit-rate-control-unit data frame is greater than zero, adjusting the first target bit rate according to the first difference value, the second bit-rate-control-unit data frame being a previous bit-rate-control-unit data frame of a first bit-rate-control-unit in the to-be-transmitted data.

It can be understood that, if the real bit rate of the second bit-rate-control-unit data frame exceeds the second target bit rate, the data transmitting-end may properly reduce the first target bit rate of the first bit-rate-control-unit data frame. The specific amount of reduction may be determined according to the first difference value between the real bit rate of the second bit-rate-control-unit and the second target bit rate of the second bit-rate-control-unit. The real bit rate of the second bit-rate-control-unit data frame refers to an actual total amount of data included in the second bit-rate-control-unit data frame after the data transmitting-end codes the second bit-rate-control-unit data frame according to the second target bit rate.

Specifically, if the first difference value is greater than zero and is less than or equal to a preset difference value, the adjusted first target bit rate is obtained by subtracting the first difference value from the first target bit rate obtained in step 102. A weighted value of a second difference value between the first difference value and the preset difference value is calculated if the first difference value is greater than the preset difference value. Then, the preset difference value and the weighted value are subtracted from the first target bit rate to obtain the adjusted first target bit rate.

The preset difference value may be a fixed value set on the data transmitting-end, or may be a value varying as the length of the first bit-rate-control-unit data frame varies. Specifically, before performing Step 103, the data transmitting-end may first determine that the preset difference value is a product of an average lowest bit rate per frame and the length of the first bit-rate-control-unit data frame.

Step 104. Coding the first bit-rate-control-unit data frame according to the adjusted first target bit rate in step 103, to enable the real bit rate of the first bit-rate-control-unit data frame to approach to the first target bit rate.

Further, if the first difference value is less than or equal to zero, to be specific, the real bit rate of the second bit-rate-control-unit data frame is less than or equal to the second target bit rate of the second bit-rate-control-unit data frame, the data transmitting-end directly codes the first bit-rate-control-unit data frame according to the first target bit rate without adjusting the first target bit rate determined in step 102.

In this way, by performing Steps 101 to 104, the length of the data frame of a bit-rate-control-unit (for example, the first bit-rate-control-unit) may be changed at any time according to an actual case, and the first bit-rate-control-unit data frame is coded according to the adjusted first target bit rate.

It may be understood that according to the method in one embodiment, each time when coding a data frame of a bit-rate-control-unit (for example, the first bit-rate-control-unit), the data transmitting-end determines the length of the current first bit-rate-control-unit data frame according to an actual requirement, determines the first target bit rate of the first bit-rate-control-unit, then adjusts the first target bit rate according to the first difference value between a real bit rate of a data frame of a previous bit-rate-control-unit (namely, the second bit-rate-control-unit) and a second target bit rate of the data frame of the previous bit-rate-control-unit, and codes the first bit-rate-control-unit data frame according to the adjusted first target bit rate. In this way, the length of the first bit-rate-control-unit data frame can be flexibly set, for example, to be less than or equal to a length of a GOP data frame, and the first target bit rate is adjusted according to an actual coding case of the previous bit-rate-control-unit data frame, so that after the first bit-rate-control-unit is coded according to the adjusted first target bit rate, a requirement for a stable bit rate in any duration, particularly, in a short time, can be satisfied.

Figure 2:
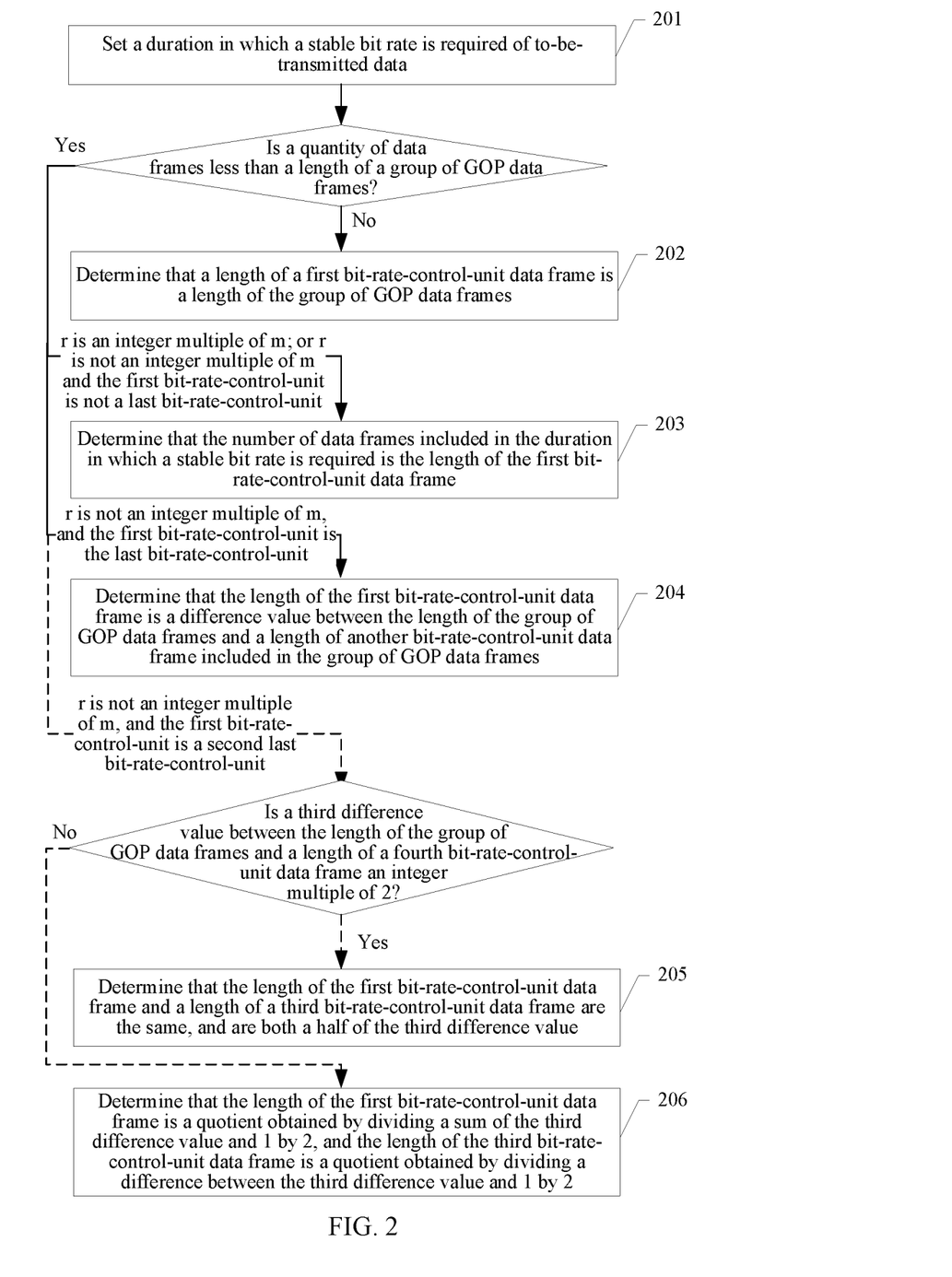
FIG. 2 is a flowchart of a method for determining a length of a first bit-rate-control-unit data frame by a data transmitting-end according to an embodiment of the present disclosure.

Referring to FIG. 2, in an embodiment, when the data transmitting-end performs Step 101, including the following steps.

Step 201. Setting a duration in which a stable bit rate is required of to-be-transmitted data, and if a number m of data frames included in the duration in which a stable bit rate is required is greater than or equal to a length r of a GOP data frame, performing Step 202.

If the number m of data frames included in the duration in which a stable bit rate is required is less than the length r of the GOP data frame, in some cases, the data transmitting-end performs Step 203; in another case, the data transmitting-end performs Step 204; and in some other cases, the data transmitting-end performs Step 205 or 206.

The duration in which a stable bit rate is required herein is a period of time in which a requirement on bit rate stability is relatively high, and the duration may be set according to a specific application of the to-be-transmitted data. For example, for some real-time video data, the duration in which a stable bit rate is required may be 1 second or 2 seconds. For some non-real-time video data, a requirement on stability of a short-time bit rate is not high, and the duration in which a stable bit rate is required does not need to be set, and a length of a first bit-rate-control-unit data frame is directly determined as the length r of a group of GOP data frames.

The number m of data frames included in the duration in which a stable bit rate is required may be obtained according to the duration in which a stable bit rate is required and a frame rate of the to-be-transmitted data, and is specifically a product of the duration in which a stable bit rate is required and the frame rate of the to-be-transmitted data.

Step 202. Determining that the length of a first bit-rate-control-unit data frame is the length r of a group of GOP data frames.

Step 203. If the length r of the group of GOP data frames is an integer multiple of the determined number m of data frames; or if the length r of the group of GOP data frames is not an integer multiple of the determined number m of data frames, and the first bit-rate-control-unit data frame is not a last bit-rate-control-unit data frame included in the group of GOP data frames, determine that the number m of data frames included in the duration in which a stable bit rate is required is the length of the first bit-rate-control-unit data frame.

It should be noted that, because the to-be-transmitted data includes a plurality of groups of GOP data frames, if the length of a bit-rate-control-unit data frame is the determined number m of data frames, and m is less than the length r of the group of GOP data frames, each group of GOP data frames may be divided into a plurality of bit-rate-control-unit data frames. In this way, a length of a last bit-rate-control-unit data frame included in a group of GOP data frames is possibly less than the number m of data frames included in the duration in which a stable bit rate is required.

Specifically, if the length r of the group of GOP data frames is not an integer multiple of the number m of data frames included in the duration in which a stable bit rate is required, and the first bit-rate-control-unit data frame is a last bit-rate-control-unit data frame included in the group of GOP data frames, the data transmitting-end performs Step 204.

Step 204. Determining that the length of the first bit-rate-control-unit data frame is a difference value between the length r of the group of GOP data frames and a length of a bit-rate-control-unit data frame other than the first bit-rate-control-unit data frame in the group of GOP data frames. A length of each of other bit-rate-control-unit data frames than the first bit-rate-control-unit data frame in the group of GOP data frames may be the determined number m of data frames.

In another embodiment, if the length r of the group of GOP data frames is not an integer multiple of the determined number m of data frames, and last two bit-rate-control-unit data frames in the group of GOP data frames are sequentially the first bit-rate-control-unit data frame and a third bit-rate-control-unit data frame, to be specific, the first bit-rate-control-unit data frame is a previous bit-rate-control-unit data frame of the third bit-rate-control-unit data frame, the data transmitting-end can determine the length of the first bit-rate-control-unit data frame by performing the following Step 205 or 206 (the part represented by a dashed-line arrow in FIG. 2):

Step 205. If a third difference value between the length r of the group of GOP data frames and a length of a fourth bit-rate-control-unit data frame is an integer multiple of 2, determine that the length of the first bit-rate-control-unit data frame and a length of a third bit-rate-control-unit data frame are the same, and are both a half of the third difference value.

The fourth bit-rate-control-unit data frame is a bit-rate-control-unit data frame other than the first bit-rate-control-unit data frame and the third bit-rate-control-unit data frame in the group of GOP data frames.

Step 206. If the third difference value between the length r of the group of GOP data frames and the length of the fourth bit-rate-control-unit data frame is not an integer multiple of 2, determine that the length of the first bit-rate-control-unit data frame is a quotient obtained by dividing a sum of the third difference value and 1 by 2, and the length of the third bit-rate-control-unit data frame is a quotient obtained by dividing a difference between the third difference value and 1 by 2.

The data coding method in the present disclosure is described below. The method in one embodiment is mainly applied to a scenario in which a WeChat client is used for a video call, a data transmitting-end being the WeChat client, and to-be-transmitted data being to-be-transmitted video data.

Figure 3:
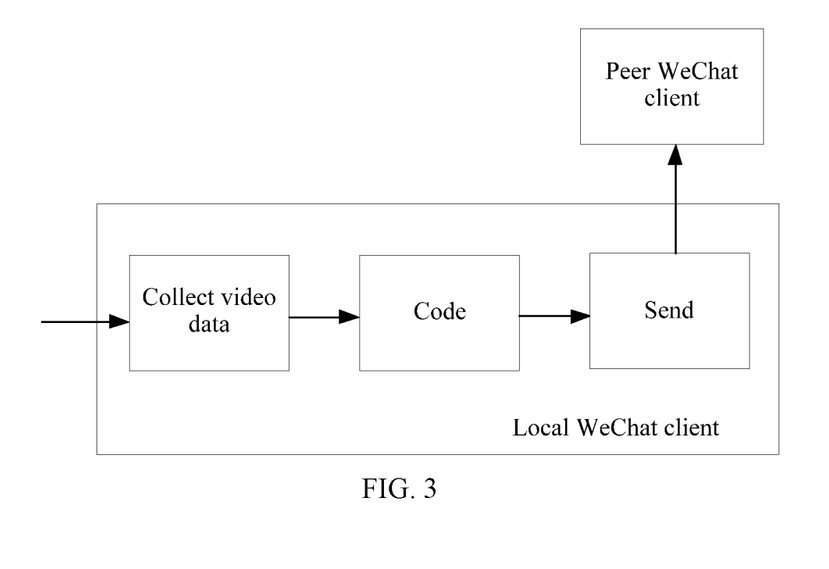
FIG. 3 is a schematic diagram of an application scenario of a data coding method according to an embodiment of the present disclosure.
Figure 4:
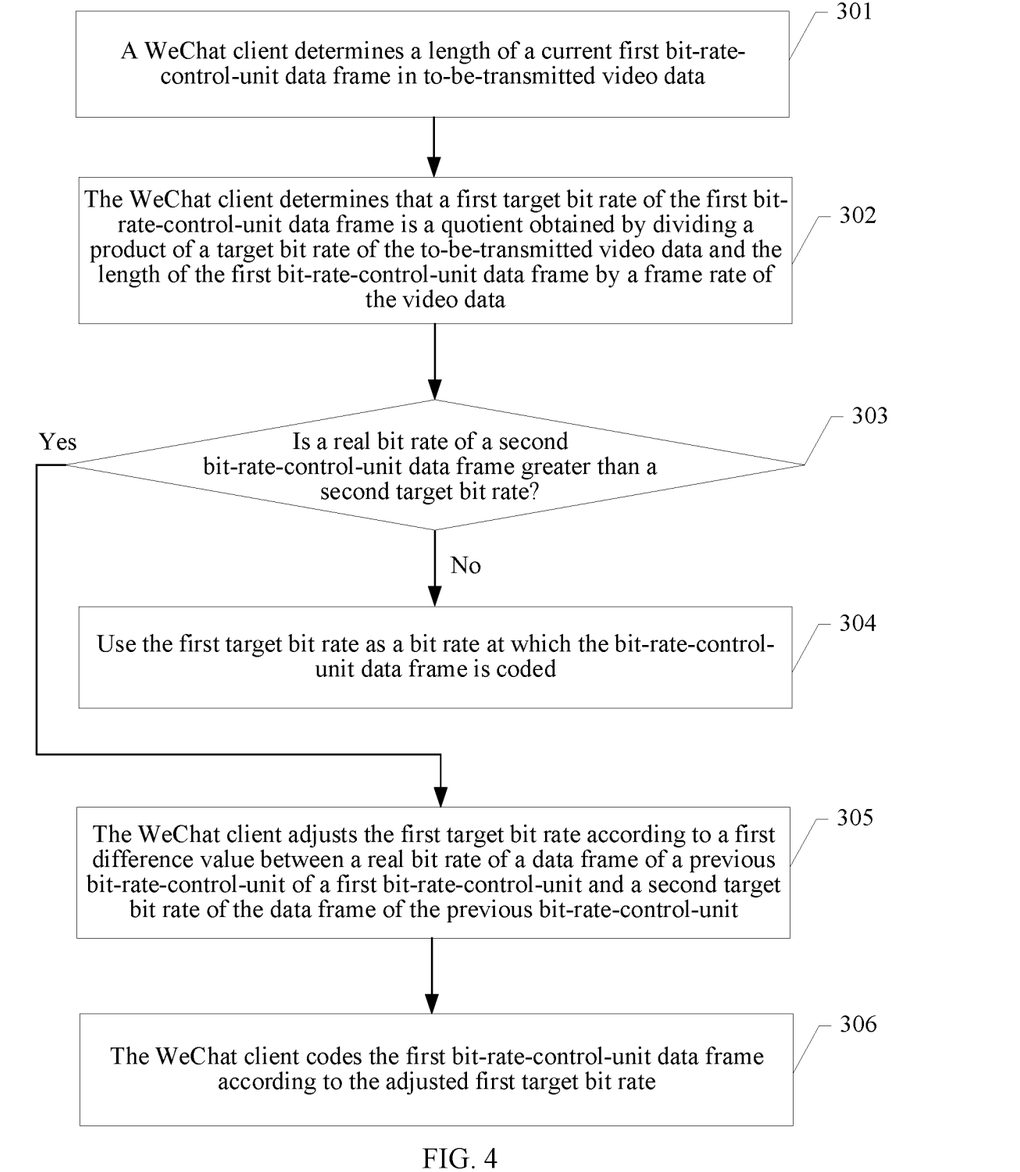
FIG. 4 is a flowchart of a data coding method according to an embodiment of the present disclosure.

Referring to FIG. 3, in a specific application, after a user initiates a video call with a peer WeChat client by using a local WeChat client, the local WeChat client collects video data of the local end, the video data including a plurality of groups of GOP data frames. The local WeChat client first codes the collected video data, and then sends the coded video data to the peer WeChat client. In a process in which the local WeChat client codes the video data, the coding may be implemented by performing the following steps. A flowchart is shown in FIG. 4, and includes the following steps.

Step 301. The WeChat client determines a length of a current first bit-rate-control-unit data frame in the to-be-transmitted video data, the length being marked as Frame_Unit.

Specifically, the WeChat client first sets a duration in which a stable bit rate is required according to the to-be-transmitted video data, and may set a corresponding duration in which a stable bit rate is required to be 1 second or 2 seconds because the to-be-transmitted video data is real-time video data; then determines, according to a frame rate of the video data, a number m of data frames included in the duration in which a stable bit rate is required.

(1) If the determined number m of data frames is greater than or equal to a length of a group of GOP data frames in the to-be-transmitted video data, the length being marked as GOP_size, the length of the first bit-rate-control-unit data frame is determined as the length of the group of GOP data frames, that is, Frame_Unit=GOP_size.

(2) If the determined number m of data frames is less than a length of a group of GOP data frames in the to-be-transmitted video data, in some cases, if the length of the group of GOP data frames is an integer multiple of the number m of data frames, or the length of the group of GOP data frames is not an integer multiple of the number m of data frames and the first bit-rate-control-unit data frame is not a last bit-rate-control-unit data frame included in the group of GOP data frames, the length of the first bit-rate-control-unit data frame is determined as the determined number m of data frames. In this case, Frame_Unit=m<GOP_size.

(3) If the determined number m of data frames is less than a length of a group of GOP data frames in the to-be-transmitted video data, in another case, if the length of the group of GOP data frames is not an integer multiple of the determined number m of data frames m, and the first bit-rate-control-unit data frame is a last bit-rate-control-unit data frame included in the group of GOP data frames, the WeChat client determines that the length of the first bit-rate-control-unit data frame is a difference value between the length of the group of GOP data frames and a length of a bit-rate-control-unit data frame other than the first bit-rate-control-unit data frame in the group of GOP data frames. That is, Frame_Unit=GOP_size−tm, t being a number of other bit-rate-control-unit data frames included in the group of GOP data frames, and the length of each of the other bit-rate-control-unit data frame being m.

(4) If the determined number m of data frames is less than a length of a group of GOP data frames in the to-be-transmitted video data, in other cases, if the length of the group of GOP data frames is not an integer multiple of the determined number m of data frames, and last two bit-rate-control-unit data frames in the group of GOP data frames are sequentially the first bit-rate-control-unit data frame and a third bit-rate-control-unit data frame, when the WeChat client determines the length of the first bit-rate-control-unit data frame, there may be the following several cases.

Specifically, it is assumed that the group of GOP data frames is divided into a plurality of bit-rate-control-unit data frames, which are respectively marked as $FU_1, FU_2, \ldots,$ $FU_{n-1}$, and $FU_n$, the first bit-rate-control-unit data frame and the third bit-rate-control-unit data frame being respectively marked as $FU_{n-1}$, and $FU_n$.

(41) If a third difference value between the length of the group of GOP data frames and a length of a fourth bit-rate-control-unit data frame is an integer multiple of 2, the fourth bit-rate-control-unit data frame being a bit-rate-control-unit data frame other than the first bit-rate-control-unit data frame and the third bit-rate-control-unit data frame in the group of GOP data frames, that is, $FU_1$, $FU_2$, ..., or $FU_{n-1}$, the WeChat client determines that the length of the first bit-rate-control-unit data frame and the length of the third bit-rate-control-unit data frame are the same, and are both a half of the third difference value, that is:

$$lFU_{n-1} = lFU_n = \frac{GOP\_size - (lFU_1 + lFU_2 + ... + lFU_{n-2})}{2}.$$

(42) If the third difference value between the length of the group of GOP data frames and the length of the fourth bit-rate-control-unit data frame is not an integer multiple of 2, it is determined that the length of the first bit-rate-control-unit data frame is a quotient obtained by dividing a sum of the third difference value and 1 by 2, and it is determined that the length of the third bit-rate-control-unit data frame is a quotient obtained by dividing a difference between the third difference value and 1 by 2, that is:

$$lFU_{n-1} = \frac{GOP\_size - (lFU_1 + lFU_2 + ... + lFU_{n-2}) + 1}{2}, \text{ and}$$

$$lFU_n = \frac{GOP\_size - (lFU_1 + lFU_2 + ... + lFU_{n-2}) - 1}{2}.$$

(43) If a difference obtained by subtracting the third difference value between the length of the group of GOP data frames and the length of the fourth bit-rate-control-unit data frame by the determined number m of data frames is still greater than a half of the determined number m of data frames, that is, $GOP\_size - (lFU_1 + lFU_2 + ... + lFU_{n-2}) - m > m/2$ but is less than the determined number m of data frames, the WeChat client may not need to determine the length of the first bit-rate-control-unit data frame according to the method in (41) or (42), but determines that the length of the first bit-rate-control-unit data frame is m and the length of the third bit-rate-control-unit data frame is GOP_size−tm.

It should be noted that $lFU_i$ in the foregoing formula represents a length of a bit-rate-control-unit data frame $FU_i$, i being any natural number between 1 and n.

(5) In other cases, if a requirement on stability of a short-time bit rate is not high according to actual application, for example, non-real-time video data, the duration in which a stable bit rate is required does not need to be set. In this case, the length of the first bit-rate-control-unit data frame may be directly determined as the length of the group of GOP data frames, that is, Frame_Unit=GOP_size.

Step 302. The WeChat client determines that a first target bit rate (marked as $Bit'_{Target\_i}$) of the first bit-rate-control-unit data frame is specifically a quotient obtained by dividing a product of a target bit rate (marked as $BitRate_{Target}$) of the to-be-transmitted video data and the length of the first bit-rate-control-unit data frame determined in step 301 by a frame rate (marked as fps) of the video data. That is, $$Bit'_{Target\_i} = \frac{BitRate_{Target}}{fps} * \text{Frame\_Unit}.$$

Step 303. The WeChat client determines whether a real bit rate of a second bit-rate-control-unit data frame is greater than a second target bit rate, and if the real bit rate is greater than the second target bit rate, performs step 305 and step 306; or if the real bit rate is less than or equal to the second target bit rate, directly perform step 304. The second bit-rate-control-unit data frame herein is a previous bit-rate-control-unit data frame of a first bit-rate-control-unit in the to-be-transmitted video data.

Step 304. Use the first target bit rate determined in step 302 as a bit rate at which the first bit-rate-control-unit data frame is coded.

Step 305. The WeChat client adjusts the first target bit rate according to a first difference value between a real bit rate (marked as $Bit_{Real\_i-1}$) of a data frame of a previous bit-rate-control-unit (that is, a second bit-rate-control-unit) of the first bit-rate-control-unit and a second target bit rate (marked as $Bit_{Target\_i-1}$) of the data frame of the previous bit-rate-control-unit.

(1) If the real bit rate of the second bit-rate-control-unit data frame is greater than the second target bit rate, and the first difference value does not exceed a preset difference value (marked as $TH_{Bit}$), the adjusted first target bit rate, marked as $Bit_{Target\_i}$, is obtained after the first difference value is subtracted from the first target bit rate.

(2) If the first difference value exceeds the preset difference value, the adjusted first target bit rate is obtained after the preset difference value and a weighted value are subtracted from the first target bit rate. The weighted value is a weighted value of a second difference value between the first difference value and the preset difference value. That is, $$Bit_{Target\_i} = \begin{cases} Bit'_{Target\_i} - (Bit_{Real\_i-1} - Bit_{Target\_i-1}) & Bit_{Real\_i-1} - Bit_{Target\_i-1} \leq TH_{Bit} \\ Bit'_{Target\_i} - TH_{Bit} - \gamma(Bit_{Real\_i-1} - Bit_{Target\_i-1} - TH_{Bit}) & Bit_{Real\_i-1} - Bit_{Target\_i-1} > TH_{Bit} \end{cases},$$

where γ is a weighting coefficient of the second difference value and may be greater than or equal to zero and be less than 1, and the preset difference value $TH_{Bit}$ may vary as the length of the first bit-rate-control-unit data frame varies. Specifically, $$TH_{Bit} = TH_{Bit\_frame} * \text{Frame\_Unit},$$

where $TH_{Bit\_frame}$ is an average lowest bit rate per frame.

Step 306. The WeChat client codes the first bit-rate-control-unit data frame according to the adjusted first target bit rate.

In this way, the WeChat client repeatedly performs steps 301 to 306 until all bit-rate-control-unit data frames included in the to-be-transmitted video data are coded.

Figure 5:
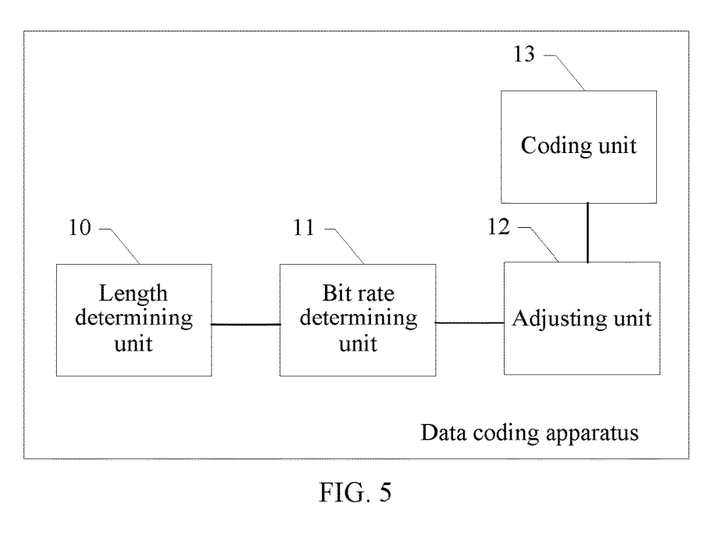
FIG. 5 is a schematic structural diagram of a data coding apparatus according to an embodiment of the present disclosure.

An embodiment of the present disclosure further provides a data coding apparatus, for example, the foregoing data transmitting-end. A schematic structural diagram of the data coding apparatus is shown in FIG. 5, and the data coding apparatus may specifically include: a length determining unit 10, a bit rate determining unit 11, an adjusting unit 12, and a coding unit 13.

The length determining unit 10 is configured to determine a length of a current first bit-rate-control-unit data frame in to-be-transmitted data, the length of the first bit-rate-control-unit data frame being less than or equal to a length of a GOP data frame;

The bit rate determining unit 11 is configured to determine a first target bit rate of the first bit-rate-control-unit data frame according to the length of the first bit-rate-control-unit data frame that is determined by the length determining unit 10, a target bit rate of the to-be-transmitted data, and a frame rate of the to-be-transmitted data;

The adjusting unit 12 is configured to: when a first difference value between a real bit rate of a second bit-rate-control-unit data frame and a second target bit rate of the second bit-rate-control-unit data frame is greater than zero, adjust, according to the first difference value, the first target bit rate determined by the bit rate determining unit 11, the second bit-rate-control-unit data frame being a previous bit-rate-control-unit data frame of a first bit-rate-control-unit in the to-be-transmitted data; and The coding unit 13 is configured to code the first bit-rate-control-unit data frame according to the first target bit rate adjusted by the adjusting unit 12.

Further, the coding unit 13 is further configured to: if the first difference value between the real bit rate of the second bit-rate-control-unit data frame and the second target bit rate of the second bit-rate-control-unit data frame is less than or equal to zero, code the first bit-rate-control-unit data frame according to the first target bit rate determined by the bit rate determining unit 11.

It may be understood that in the apparatus of one embodiment, each time when the coding unit 13 codes a data frame of a bit-rate-control-unit (for example, the first bit-rate-control-unit), the length determining unit 10 determines the length of the current first bit-rate-control-unit data frame according to an actual requirement, the bit rate determining unit 11 determines the first target bit rate of the first bit-rate-control-unit, then the adjusting unit 12 adjusts the first target bit rate according to the first difference value between a real bit rate of a data frame of a previous bit-rate-control-unit (namely, the second bit-rate-control-unit) and the second target bit rate of the data frame of the previous bit-rate-control-unit, and the coding unit 13 codes the first bit-rate-control-unit data frame according to the adjusted first target bit rate. In this way, the length of the first bit-rate-control-unit data frame can be flexibly set, for example, to be less than or equal to a length of a GOP data frame, and the first target bit rate is adjusted according to an actual coding case of the previous bit-rate-control-unit data frame, so that after the first bit-rate-control-unit is coded according to the adjusted first target bit rate, a requirement for a stable bit rate in any duration, particularly, in a short time, can be satisfied.

In one embodiment, the length determining unit 10 is specifically configured to: set a duration in which a stable bit rate is required of the to-be-transmitted data, and if a number of data frames included in the duration in which a stable bit rate is required is greater than or equal to the length of the GOP data frame, determine that the length of the first bit-rate-control-unit data frame is the length of the GOP data frame.

Further, the length determining unit 10 is further configured to: if the number of data frames included in the duration in which a stable bit rate is required is less than the length of the GOP data frame, determine that the number of data frames included in the duration in which a stable bit rate is required is the length of the first bit-rate-control-unit data frame, if the length of the GOP data frame is an integer multiple of the number of data frames, or if the length of the GOP data frame is not an integer multiple of the number of data frames and the first bit-rate-control-unit data frame is not a last bit-rate-control-unit data frame included in the GOP data frame; or determine that the length of the first bit-rate-control-unit data frame is a difference value between the length of the GOP data frame and a length of a bit-rate-control-unit data frame other than the first bit-rate-control-unit data frame in the GOP data frame, if the length of the GOP data frame is not an integer multiple of the number of data frames and the first bit-rate-control-unit data frame is the last bit-rate-control-unit data frame included in the GOP data frame.

In other cases, the length determining unit 10 is further configured to: if the length of the GOP data frame is not an integer multiple of the number of data frames and last two bit-rate-control-unit data frames in the GOP data frame are sequentially the first bit-rate-control-unit data frame and a third bit-rate-control-unit data frame.

If a third difference value between the length of the GOP data frame and a length of a fourth bit-rate-control-unit data frame is an integer multiple of 2, determine that the length of the first bit-rate-control-unit data frame and a length of the third bit-rate-control-unit data frame are the same, and are both a half of the third difference value, the fourth bit-rate-control-unit data frame being a bit-rate-control-unit data frame other than the first bit-rate-control-unit data frame and the third bit-rate-control-unit data frame in the GOP data frame; and if the third difference value between the length of the GOP data frame and the length of the fourth bit-rate-control-unit data frame is not an integer multiple of 2, determine that the length of the first bit-rate-control-unit data frame is a quotient obtained by dividing a sum of the third difference value and 1 by 2, and the length of the third bit-rate-control-unit data frame is a quotient obtained by dividing a difference between the third difference value and 1 by 2.

In another embodiment, the bit rate determining unit 11 is specifically configured to determine that the first target bit rate is a quotient obtained by dividing a product of the target bit rate of the to-be-transmitted data and the length of the first bit-rate-control-unit data frame by the frame rate of the to-be-transmitted data.

In another embodiment, the adjusting unit 12 is specifically configured to: if the first difference value is greater than zero and is less than or equal to a preset difference value, obtain the adjusted first target bit rate by subtracting the first difference value from the first target bit rate; and calculate a weighted value of a second difference value between the first difference value and the preset difference value if the first difference value is greater than the preset difference value, and obtain the adjusted first target bit rate by subtracting the preset difference value and the weighted value from the first target bit rate.

The adjusting unit 12 is further configured to: before adjusting the first target bit rate according to the first difference value, adjust the preset difference value to be a product of the length of the first bit-rate-control-unit data frame and an average lowest bit rate per frame.

An embodiment of the present disclosure further provides a data coding apparatus, for example, the foregoing data transmitting-end. The data coding apparatus includes at least one memory and at least one processor.

The at least one memory is configured to store computer instructions.

The at least one processor is configured to invoke the computer instructions stored in the at least one memory to perform the followings:

determining a length of a current first bit-rate-control-unit data frame in to-be-transmitted data, the length of the first bit-rate-control-unit data frame being less than or equal to a length of a group of pictures data frame;

determining a first target bit rate of the first bit-rate-control-unit data frame according to the length of the first bit-rate-control-unit data frame, a target bit rate of the to-be-transmitted data, and a frame rate of the to-be-transmitted data;

when a first difference value between a real bit rate of a second bit-rate-control-unit data frame and a second target bit rate of the second bit-rate-control-unit data frame is greater than zero, adjusting the first target bit rate according to the first difference value the second bit-rate-control-unit data frame being a previous bit-rate-control-unit data frame of a first bit-rate-control-unit in the to-be-transmitted data; and coding the first bit-rate-control-unit data frame according to the adjusted first target bit rate.

In one embodiment of the present disclosure, the computer instruction for determining the length of the current first bit-rate-control-unit data frame in the to-be-transmitted data may specifically include the following computer instructions for performing:

setting a duration in which a stable bit rate is required of the to-be-transmitted data, and if a number of data frames included in the duration in which a stable bit rate is required is greater than or equal to the length of the group of pictures data frame, determining that the length of the first bit-rate-control-unit data frame is the length of the group of pictures data frame; and if the number of data frames included in the duration in which a stable bit rate is required is less than the length of the group of pictures data frame, determining, by the data transmitting-end, that the number of data frames included in the duration in which a stable bit rate is required is the length of the first bit-rate-control-unit data frame, if the length of the group of pictures data frame is an integer multiple of the number of data frames, or if the length of the group of pictures data frame is not an integer multiple of the number of data frames and the first bit-rate-control-unit data frame is not a last bit-rate-control-unit data frame included in the group of pictures data frame; or determining that the length of the first bit-rate-control-unit data frame is a difference value between the length of the group of pictures data frame and a length of a bit-rate-control-unit data frame other than the first bit-rate-control-unit data frame in the group of pictures data frame, if the length of the group of pictures data frame is not an integer multiple of the number of data frames and the first bit-rate-control-unit data frame is the last bit-rate-control-unit data frame included in the group of pictures data frame.

Further, if the length of the group of pictures data frame is not an integer multiple of the number of data frames, and last two bit-rate-control-unit data frames in the group of pictures data frame are sequentially the first bit-rate-control-unit data frame and a third bit-rate-control-unit data frame, the computer instructions further include: if a third difference value between the length of the group of pictures data frame and a length of a fourth bit-rate-control-unit data frame is an integer multiple of 2, determining that the length of the first bit-rate-control-unit data frame and a length of the third bit-rate-control-unit data frame are the same, and are both a half of the third difference value, the fourth bit-rate-control-unit data frame being a bit-rate-control-unit data frame other than the first bit-rate-control-unit data frame and the third bit-rate-control-unit data frame in the group of pictures data frame; and if the third difference value between the length of the group of pictures data frame and the length of the fourth bit-rate-control-unit data frame is not an integer multiple of 2, determining that the length of the first bit-rate-control-unit data frame is a quotient obtained by dividing a sum of the third difference value and 1 by 2, and the length of the third bit-rate-control-unit data frame is a quotient obtained by dividing a difference between the third difference value and 1 by 2.

In one embodiment of the present disclosure, the computer instruction for determining a first target bit rate of the first bit-rate-control-unit data frame according to the length of the first bit-rate-control-unit data frame, a target bit rate of the to-be-transmitted data, and a frame rate of the to-be-transmitted data may specifically include: determining that the first target bit rate is a quotient obtained by dividing a product of the target bit rate of the to-be-transmitted data and the length of the first frame bit-rate-control-unit data frame by the frame rate of the to-be-transmitted data.

In one embodiment of the present disclosure, the computer instruction for adjusting the first target bit rate according to a first difference value may specifically include: if the first difference value is greater than zero and is less than or equal to a preset difference value, obtaining, by the data transmitting-end, the adjusted first target bit rate by subtracting the first difference value from the first target bit rate; and calculating, by the data transmitting-end, a weighted value of a second difference value between the first difference value and the preset difference value if the first difference value is greater than the preset difference value, and obtaining the adjusted first target bit rate by subtracting the preset difference value and the weighted value from the first target bit rate.

Before the adjusting the first target bit rate according to a first difference value, the computer instructions further include: determining that the preset difference value is a product of the length of the first bit-rate-control-unit data frame and an average lowest bit rate per frame.

In one embodiment of the present disclosure, the computer instructions may further include: when the first difference value between the real bit rate of the second bit-rate-control-unit data frame and the second target bit rate of the second bit-rate-control-unit data frame is less than or equal to zero, using the determined first target bit rate as a bit rate at which the first bit-rate-control-unit data frame is coded, and coding the first bit-rate-control-unit data frame.

Figure 6:
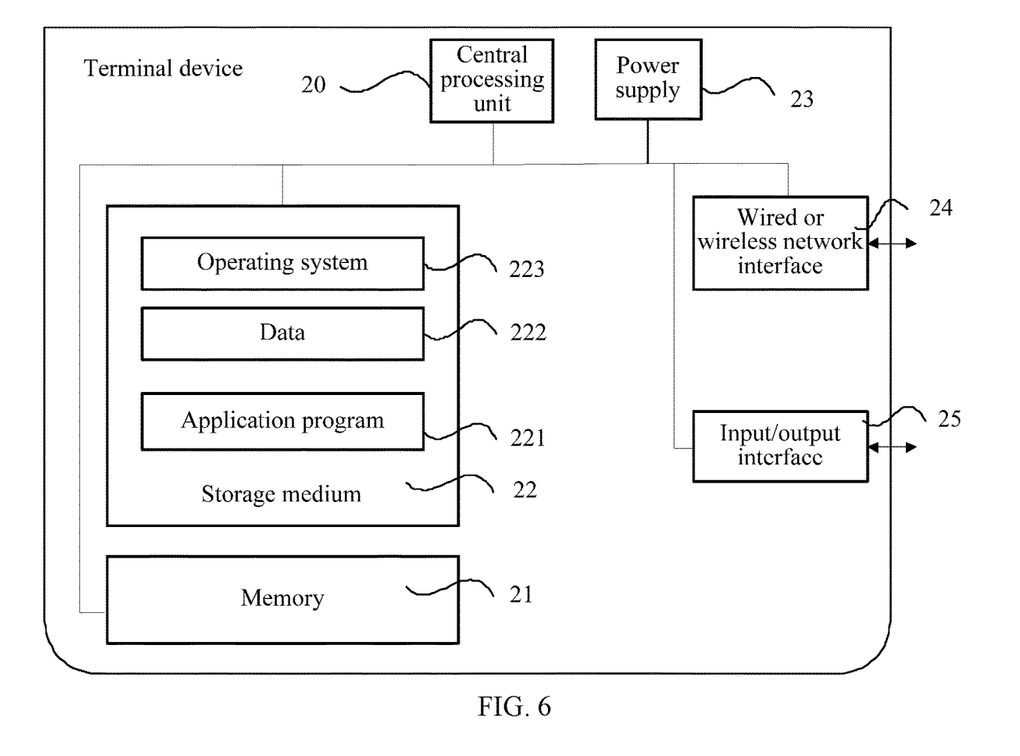
FIG. 6 is a schematic structural diagram of a terminal device according to an embodiment of the present disclosure.

An embodiment of the present disclosure further provides a terminal device. A schematic structural diagram of the terminal device is shown in FIG. 6. The terminal device may vary greatly due to different configurations or performance, and may include one or more central processing units (CPU) 20 (for example, one or more processors), a memory 21, and one or more storage media 22 (for example, one or more mass storage devices) that store application programs 221 or data 222. The memory 21 and the storage medium 22 may be transient or persistent storages. The program stored in the storage medium 22 may include one or more modules (not shown), and each module may include a series of instructions and operations for the terminal device. Further, the CPU 20 may be configured to: communicate with the storage medium 22; and perform, on the terminal device, the series of instructions and operations in the storage medium 22.

Specifically, the application program 221 stored in the storage medium 22 includes a data coding application program, and the program may include the length determining unit 10, the bit rate determining unit 11, the adjusting unit 12, and the coding unit 13 that are in the foregoing data coding apparatus. Details are not described herein. Further, the CPU 20 may be configured to: communicate with the storage medium 22; and perform, on the terminal device, a series of operations corresponding to the data coding application program stored in the storage medium 22.

The terminal device may further include one or more power supplies 23, one or more wired or wireless network interfaces 24, one or more input/output interfaces 25, and/or one or more operating systems 223, for example, Windows Server™, Mac OS X™, Unix™, Linux™, or FreeBSD™.

Steps performed by the data transmitting-end in the foregoing method embodiment may be based on a structure of the terminal device that is shown in FIG. 6.

An embodiment of the present disclosure further provides a non-volatile computer-readable storage medium, the non-volatile computer-readable storage medium storing a plurality of instructions, the instruction being operable to be loaded by a processor to perform the data coding method performed by the data transmitting-end in the foregoing embodiments.

An embodiment of the present disclosure further provides a terminal device, including a processor and a storage device, the processor being configured to implement each instruction; and the storage device being configured to store a plurality of instructions, the instruction being operable to be loaded by the processor to perform the data coding method performed by the data transmitting-end in the foregoing embodiments.

A person of ordinary skill in the art may understand that all or some of the steps of the methods in the embodiments may be implemented by a program instructing relevant hardware. The program may be stored in a computer-readable storage medium. The storage medium may include a read-only memory (ROM), a random-access memory (RAM), a magnetic disk, an optical disc, or the like.

According to the disclosed embodiments, each time when coding a data frame of a bit-rate-control-unit (for example, the first bit-rate-control-unit), the data transmitting-end determines the length of the current first bit-rate-control-unit data frame according to an actual requirement, determines the first target bit rate of the first bit-rate-control-unit, then adjusts the first target bit rate according to the first difference value between a real bit rate of a data frame of a previous bit-rate-control-unit (namely, the second bit-rate-control-unit) and a second target bit rate of the data frame of the previous bit-rate-control-unit, and codes the first bit-rate-control-unit data frame according to the adjusted first target bit rate. In this way, the length of the first bit-rate-control-unit data frame can be flexibly set, for example, to be less than or equal to a length of a GOP data frame, and the first target bit rate is adjusted according to an actual coding case of the previous bit-rate-control-unit data frame, so that after the first bit-rate-control-unit is coded according to the adjusted first target bit rate, a requirement for a stable bit rate in any duration, particularly, in a short time, can be satisfied.

The data coding method and apparatus, the storage device, and the terminal device that are provided in the embodiments of the present disclosure are described in detail above. Principles and implementations of the present disclosure have been explained herein with reference to embodiments. The embodiments are used only to help understand the method and core thought of the present disclosure. Meanwhile, a person of ordinary skill in the art can have variations in specific implementations and the application scope based on thoughts of the present disclosure. To conclude, the content of the specification should not be construed as a limitation to the present disclosure.

What is claimed is:

1. A data coding method, comprising:
   determining, by a computing device, a length of a first bit-rate-control-unit data frame in to-be-transmitted data, the length of the first bit-rate-control-unit data frame being less than or equal to a length of a group of pictures (GOP) data frame;
   determining, by the computing device, a first target bit rate of the first bit-rate-control-unit data frame according to the length of the first bit-rate-control-unit data frame, a target bit rate of the to-be-transmitted data, and a frame rate of the to-be-transmitted data;
   in response to determining a first difference value between a real bit rate of a second bit-rate-control-unit data frame and a second target bit rate of the second bit-rate-control-unit data frame is greater than zero, adjusting, by the computing device, the first target bit rate according to the first difference value to obtain an adjusted first target bit rate, the second bit-rate-control-unit data frame being a previous bit-rate-control-unit data frame of the first bit-rate-control-unit data frame in the to-be-transmitted data, wherein adjusting the first target bit rate according to the first difference value comprises:
      obtaining the adjusted first target bit rate by subtracting the first difference value from the first target bit rate, in response to determining the first difference value is greater than zero and is less than or equal to a preset difference value; and
      calculating a weighted value of a second difference value between the first difference value and the preset difference value, in response to determining the first difference value is greater than the preset difference value, and obtaining the adjusted first target bit rate by subtracting the preset difference value and the weighted value from the first target bit rate; and
   coding, by the computing device, the first bit-rate-control-unit data frame according to the adjusted first target bit rate.

2. The method according to claim 1, wherein determining the length of the current first bit-rate-control-unit data frame comprises:
   setting a duration for the to-be-transmitted data; and
   in response to determining a number of data frames included in the duration is greater than or equal to the length of the GOP data frame, determining that the length of the first bit-rate-control-unit data frame is the length of the GOP data frame.

3. The method according to claim 2, wherein the length of the GOP data frame is not an integer multiple of the number of data frames and last two bit-rate-control-unit data frames in the GOP data frame are the first bit-rate-control-unit data frame and a third bit-rate-control-unit data frame.

4. The method according to claim 1, wherein determining the first target bit rate comprises:
   determining that the first target bit rate is a quotient obtained by dividing a product of the target bit rate of the to-be-transmitted data and the length of the first frame bit-rate-control-unit data frame by the frame rate of the to-be-transmitted data.

5. The method according to claim 1, further comprising: determining that the preset difference value is a product of the length of the first bit-rate-control-unit data frame and an average lowest bit rate per frame.

6. The method according to claim 1, further comprising: in response to determining the first difference value is less than or equal to zero, coding the first bit-rate-control-unit data frame at the first target bit rate.

7. A data coding apparatus, comprising: a memory storing computer program instructions; and a processor coupled to the memory and configured to execute the computer program instructions and perform:
  determining a length of a first bit-rate-control-unit data frame in to-be-transmitted data, the length of the first bit-rate-control-unit data frame being less than or equal to a length of a group of pictures (GOP) data frame;
  determining a first target bit rate of the first bit-rate-control-unit data frame according to the length of the first bit-rate-control-unit data frame, a target bit rate of the to-be-transmitted data, and a frame rate of the to-be-transmitted data;
  in response to determining a first difference value between a real bit rate of a second bit-rate-control-unit data frame and a second target bit rate of the second bit-rate-control-unit data frame is greater than zero, adjusting the first target bit rate according to the first difference value to obtain an adjusted first target bit rate, the second bit-rate-control-unit data frame being a previous bit-rate-control-unit data frame of a first bit-rate-control-unit in the to-be-transmitted data, wherein adjusting the first target bit rate according to the first difference value comprises:
    obtaining the adjusted first target bit rate by subtracting the first difference value from the first target bit rate, in response to determining the first difference value is greater than zero and is less than or equal to a preset difference value; and
    calculating a weighted value of a second difference value between the first difference value and the preset difference value, in response to determining the first difference value is greater than the preset difference value, and obtaining the adjusted first target bit rate by subtracting the preset difference value and the weighted value from the first target bit rate; and
  coding the first bit-rate-control-unit data frame according to the adjusted first target bit rate.

8. The apparatus according to claim 7, wherein the processor is further configured to execute the computer program instructions and perform:
  setting a duration for the to-be-transmitted data; and
  in response to determining a number of data frames included in the duration is greater than or equal to the length of the GOP data frame, determining that the length of the first bit-rate-control-unit data frame is the length of the GOP data frame.

9. The apparatus according to claim 8, wherein the processor is further configured to execute the computer program instructions and perform:
  determining the length of the GOP data frame is not an integer multiple of the number of data frames and last two bit-rate-control-unit data frames in the GOP data frame are sequentially the first bit-rate-control-unit data frame and a third bit-rate-control-unit data frame.

10. The apparatus according to claim 7, wherein the processor is further configured to execute the computer program instructions and perform
  determining that the first target bit rate is a quotient obtained by dividing a product of the target bit rate of the to-be-transmitted data and the length of the first bit-rate-control-unit data frame by the frame rate of the to-be-transmitted data.

11. The apparatus according to claim 7, wherein the processor is further configured to execute the computer program instructions and perform:
  adjusting the preset difference value to be a product of the length of the first bit-rate-control-unit data frame and an average lowest bit rate per frame.

12. A non-transitory computer-readable storage medium storing computer program instructions executable by at least one processor to perform:
  determining a length of a current first bit-rate-control-unit data frame in to-be-transmitted data, the length of the first bit-rate-control-unit data frame being less than or equal to a length of a group of pictures (GOP) data frame;
  determining a first target bit rate of the first bit-rate-control-unit data frame according to the length of the first bit-rate-control-unit data frame, a target bit rate of the to-be-transmitted data, and a frame rate of the to-be-transmitted data;
  in response to determining a first difference value between a real bit rate of a second bit-rate-control-unit data frame and a second target bit rate of the second bit-rate-control-unit data frame is greater than zero, adjusting the first target bit rate according to the first difference value to obtain an adjusted first target bit rate, the second bit-rate-control-unit data frame being a previous bit-rate-control-unit data frame of the first bit-rate-control-unit data frame in the to-be-transmitted data, wherein adjusting the first target bit rate according to the first difference value comprises:
    obtaining the adjusted first target bit rate by subtracting the first difference value from the first target bit rate, in response to determining the first difference value is greater than zero and is less than or equal to a preset difference value; and
    calculating a weighted value of a second difference value between the first difference value and the preset difference value, in response to determining the first difference value is greater than the preset difference value, and obtaining the adjusted first target bit rate by subtracting the preset difference value and the weighted value from the first target bit rate; and
  coding the first bit-rate-control-unit data frame according to the adjusted first target bit rate.

13. The non-transitory computer-readable storage medium according to claim 12, wherein determining the length of the current first bit-rate-control-unit data frame comprises:
  setting a duration for the to-be-transmitted data; and
  in response to determining a number of data frames included in the duration is greater than or equal to the length of the GOP data frame, determining that the length of the first bit-rate-control-unit data frame is the length of the GOP data frame.

14. The non-transitory computer-readable storage medium according to claim 13, wherein the length of the GOP data frame is not an integer multiple of the number of data frames and last two bit-rate-control-unit data frames in the GOP data frame are the first bit-rate-control-unit data frame and a third bit-rate-control-unit data frame.

15. The non-transitory computer-readable storage medium according to claim 12, wherein determining the first target bit rate comprises:
  determining that the first target bit rate is a quotient obtained by dividing a product of the target bit rate of the to-be-transmitted data and the length of the first frame bit-rate-control-unit data frame by the frame rate of the to-be-transmitted data.

16. The non-transitory computer-readable storage medium according to claim 12, wherein the processor further performs:
  determining that the preset difference value is a product of the length of the first bit-rate-control-unit data frame and an average lowest bit rate per frame.

17. The non-transitory computer-readable storage medium according to claim 12, wherein the processor further performs:
  in response to determining the first difference value is less than or equal to zero, coding the first bit-rate-control-unit data frame at the first target bit rate.

18. The method according to claim 1, wherein determining the length of the current first bit-rate-control-unit data frame comprises:
  setting a duration for the to-be-transmitted data; and
  in response to determining the number of data frames included in the duration is less than the length of the GOP data frame, determining that the number of data frames included in the duration is the length of the first bit-rate-control-unit data frame.

19. The data coding apparatus according to claim 7, wherein the processor is further configured to execute the computer program instructions and perform:
  setting a duration for the to-be-transmitted data; and
  in response to determining the number of data frames included in the duration is less than the length of the GOP data frame, determining that the number of data frames included in the duration is the length of the first bit-rate-control-unit data frame.

20. The non-transitory computer-readable storage medium according to claim 11, wherein determining the length of the current first bit-rate-control-unit data frame comprises:
  setting a duration for the to-be-transmitted data; and
  in response to determining the number of data frames included in the duration is less than the length of the GOP data frame, determining that the number of data frames included in the duration is the length of the first bit-rate-control-unit data frame.

* * * * *